Jan. 22, 1957  A. LASCH ET AL  2,778,482

SCREW CONVEYOR

Filed Aug. 15, 1955

INVENTORS:
Albert Lasch
Alfred Stroebel
by:
Michael S. Striker
agt.

United States Patent Office 2,778,482
Patented Jan. 22, 1957

2,778,482
SCREW CONVEYOR

Albert Lasch, Stuttgart-Bad Cannstatt, and Alfred Stroebel, Stuttgart-Weil im Dorf, Germany, assignors to Werner & Pfleiderer Maschinenfabriken und Ofenbau, Stuttgart, Germany Application August 15, 1955, Serial No. 528,424
Claims priority, application Germany August 13, 1954
12 Claims. (Cl. 198—213)

The present invention relates to screw conveyors.

More particularly, the present invention relates to screw conveyors which are adapted to convey pasty masses, such as sticky, smudgy, fatty, ceramic, rubber-like, plastic, etc. substances.

There exist screw conveyors which are capable of conveying pasty masses, the arrangement of the parts, however, being such that great difficulty is encountered in cleaning the apparatus after use. Moreover, known devices are incapable of completing the conveyance of masses still contained within the apparatus after the feeding of the mass has ceased, so that a relatively large quantity of the substance to be conveyed will remain within the apparatus. Also, it is often highly desirable to knead the pasty substance while it is being conveyed through the screw conveyor, and known devices, while being capable of transporting and conveying pasty substances, are not particularly suited for kneading or otherwise treating the substance during transport.

It is therefore one of the objects of the present invention to provide a screw conveyor which overcomes the above disadvantages.

It is another object of the present invention to provide a screw conveyor which is capable of conveying or transporting all of a pasty substance which has been supplied thereto.

The object of the present invention also includes the provision of a screw conveyor which is capable of cleaning itself during use.

It is yet another object of the present invention to provide a screw conveyor which is capable of kneading a pasty substance while the same is being moved through the screw conveyor.

It is still another object of the present invention to provide a screw conveyor which comprises a minimum number of parts and which may therefore be constructed at low cost and which will give long periods of trouble-free service.

With the above objects in view, the present invention mainly consists in a screw conveyor which comprises a housing, a pair of similar conveyor screws having oppositely directed alternate helical screw grooves and screw ribs and being rotatably mounted in the housing adjacent each other in such a manner that the screw grooves register with each other during simultaneous rotation of the conveyor screws, and a plurality of transverse vanes in the screw grooves of each of the conveyor screws. The transverse vanes of each of the conveyor screws are spaced from each other and extend outwardly beyond the screw ribs of the one conveyor screw and are shaped so as to project into the screw grooves of the other of the conveyor screws.

In a preferred embodiment of the present invention the axial length of the screw groove of each of the conveyor screws is substantially greater than the axial length of the screw rib thereof. Also, the screw groove of each of the conveyor screws has a substantially rectangular cross-sectional configuration.

Preferably, the vanes of each one of the conveyor screws engages the bottom of the screw groove of the other conveyor screw, the thickness of at least the outer portion of each of the transverse vanes being smaller than the space between consecutive transverse vanes in the region of the inner portions thereof so that the outer portions of each transverse vane of each one of the conveyor screws may be freely received within the space between two consecutive transverse vanes of the other of the conveyor screws during rotation of both of the conveyor screws. Also, the transverse vanes of each of the conveyor screws are preferably arranged along one or more helical paths and each of the transverse vanes preferably forms an angle with a radial plane passing therethrough and emanating from the axis of the respective conveyor screw.

The housing is an elongated one and has supply conduit means in communication with the interior of the housing in the region of one end thereof and removal conduit means in communication with the interior of the housing in the region of the other end thereof. As a result, a pasty mass or the like introduced through the supply conduit means into the interior of the housing will, during rotation of the conveyor screws in predetermined opposite directions, be moved through the housing to the removal conduit means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
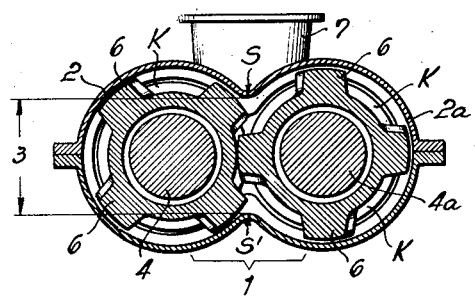
Fig. 2 is a sectional view taken along line II—II of Fig. 1.
Figure 3:
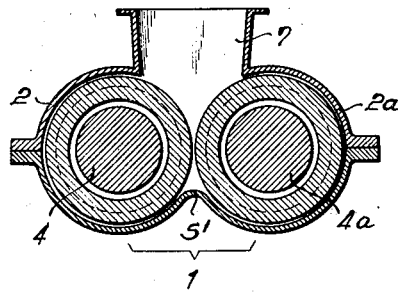
Fig. 3 is a sectional view taken along line III—III of Fig. 1.

Referring now to the drawing, there is shown an elongated housing 1 which is composed of two adjacent substantially cylindrical housing portions 2 and 2a. The housing portions 2 and 2a together form a housing 1 of substantially an 8-shaped cross-sectional configuration, as may best be seen in Fig. 2. The housing portions 2 and 2a are joined throughout their length so as to form a gap 3.

Two conveyor screws 4 and 4a are rotatably mounted within the housing portions 2 and 2a, respectively about spaced axis of rotation. The conveyor screws 4 and 4a are similar to each other, except that one is formed with a right-hand thread and the other is formed with a left-hand thread.

As is clearly shown in the drawing, each of the conveyor screws is formed with alternate helical screw grooves and screw ribs, the axial length of the former preferably being substantially greater than the axial length of the latter. If desired, the axial length of the screw rib of each conveyor screw, indicated at b, may increase throughout the length of the conveyor screw.

Figure 1:
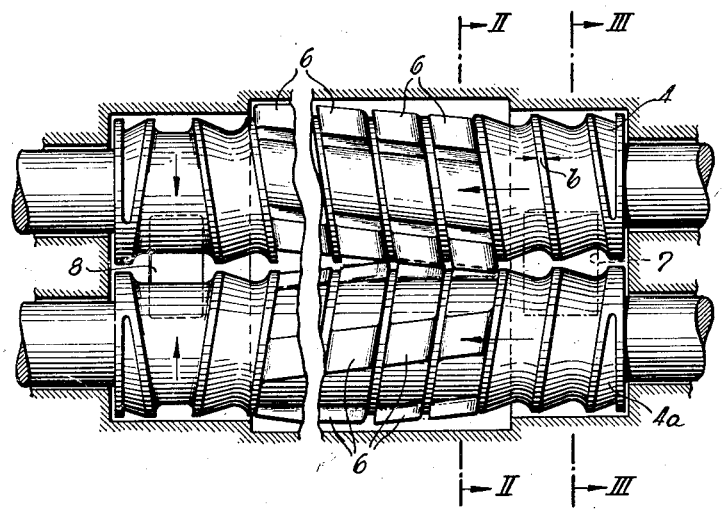
Fig. 1 is a plan view, partly in section, of a preferred embodiment of the present invention.

Also, the pitch or lead of the conveyor screw is preferably constant throughout the entire length thereof, but may, if desired, decrease from the right end of the conveyor screws to the left end thereof, as viewed in Fig. 1.

As is best seen in Fig. 1, the screw groove on each of the conveyor screws has a substantially rectangular cross-sectional configuration, and a plurality of transverse vanes 6 are arranged within and extend across the grooves. The vanes 6 which may be integral with the respective conveyor screws extend outwardly beyond the screw rib of each respective screw and are shaped so as to project into the screw groove of the other conveyor screw. Preferably, each vane extends outwardly sufficiently so as to be adapted to engage the bottom of the opposite screw groove, or at least be able to approach the same very closely.

The vanes of each conveyor screw may, if desired, be arranged along one or more helical paths, as is clearly shown in Fig. 1. Also, each of the vanes may be arranged so as to form a relatively small angle with a radial plane which passes through each respective vane and emanates from the axis of the respective conveyor screw.

Any arrangement of the vanes is acceptable so long as the same are disposed in such a manner that the vanes of one of the conveyor screws may freely be received between the space formed between two adjacent vanes of the other conveyor screws during rotation of the conveyor screws in opposite directions. It is therefore desirable that the thickness of at least the outer portion of each transverse vane is smaller than the space between consecutive transverse vanes in the region of the inner portions thereof, as may best be seen in Fig. 2.

As is clearly shown in the drawing, the transverse vanes 6 are provided only throughout a portion of the total axial length of the conveyor screws. Consequently, the housing portions 2 and 2a, which must have an interior configuration sufficiently large to accommodate the outwardly extended vanes 6 during rotation of the conveyor screws, are, throughout such portion, somewhat larger than throughout the remainder of their lengths.

The housing 1 is formed with a supply conduit means 7 and a removal conduit means 8 which conduits are disposed at opposite ends of the housing. In this way a pasty mass or the like introduced through the supply conduit means 7 will, during rotation of the conveyor screws 4 and 4a in the opposite directions indicated by the arrows 9 and 9a, respectively, be moved through the housing in the direction of the arrows 10 to the removal conduit means 8.

It will be understood from the above that a pasty substance or the like introduced through the supply conduit means 7 will be received within the chambers K formed between consecutive transverse partitions 6. The substance in addition to being moved axially in the direction of the arrows 10 will be kneaded in all directions, thereby improving the homogeneity of the consistency thereof. By virtue of the fact that a vane 6 projects into each of the chambers K, and preferably in such a manner as to engage the bottom of the groove, all particles of the substance are subjected to an extremely efficient kneading action. Moreover, all of the particles will be removed from each chamber K during rotation of the conveyor screws 4 and 4a, thereby insuring uninterrupted leftward movement of all of the substance even after no further substance is introduced through the supply conduit means 7. In this way the apparatus is entirely self-cleaning.

Also, it will be seen that any one chamber K which is opened in the region of the upper edge S of the gap 3 during rotation of the conveyor screws will be penetrated by one of the vanes 6. In this way, that quantity of the substance located in such chamber K is crushed, kneaded, and otherwise treated while being moved axially in the direction of the arrows 10. Moreover, the material during continued rotation of the conveyor screws is temporarily dammed up in the region of the lower edge s' of the gap 3 and may enter another chamber K. During still further rotation of the conveyor screws, the material is continued to be moved axially in the direction of the arrows 10 while being further kneaded. This process is repeated until the substance within all of the chambers K is expelled through the removal conduit means 8.

It will be understood that each of the elements described above, or two or more together, may also find a useful application in other types of screw conveyors differing from the types described above.

While the invention has been illustrated and described as embodied in a screw conveyor for transporting pasty masses or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws.

2. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws, the transverse vanes of each of said conveyor screws being arranged along at least one helical path.

3. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws, the transverse vanes of each of said conveyor screws being arranged along a plurality of helical paths.

4. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws, each of said transverse vanes forming an angle with a radial plane passing therethrough and emanating from the axis of the respective conveyor screw.

5. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws and to engage the bottom thereof.

6. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of spaced transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws, the thickness of each of said transverse vanes being smaller than the space between consecutive transverse vanes so that each transverse vane of each one of said conveyor screws may be freely received within the space between two adjacent transverse vanes of the other of said conveyor screws during rotation of both of said conveyor screws.

7. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of spaced transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws and to engage the bottom thereof, the thickness of at least the outer portion of each of said transverse vanes being smaller than the space between consecutive transverse vanes in the region of the inner portions thereof so that the outer portion of each transverse vane of each one of said conveyor screws may be freely received within the space between two adjacent transverse vanes of the other of said conveyor screws during rotation of both of said conveyor screws.

8. A screw conveyor comprising, in combination, an elongated housing having supply conduit means in communication with the interior of said housing in the region of one end thereof and removal conduit means in communication with the interior of said housing in the region of the other end thereof; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws, whereby a pasty mass or the like introduced through said supply conduit means into the interior of said housing will, during rotation of said conveyor screws in predetermined opposite directions, be moved through said housing to said removal conduit means.

9. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of transverse vanes in the screw groove of each of said conveyor screws extending outwardly beyond the screw rib of said one conveyor screw and being shaped so as to project into the screw groove of the other of said conveyor screws and to engage the bottom thereof, the transverse vanes of each of said conveyor screws being arranged along a plurality of helical paths and each of said transverse vanes forming an angle with a radial plane passing therethrough and emanating from the axis of the respective conveyor screw.

10. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws; and a plurality of spaced transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws and to engage the bottom thereof, the thickness of at least the outer portion of each of said transverse vanes being smaller than the space between consecutive transverse vanes in the region of the inner portions thereof so that the outer portion of each transverse vane of each one of said conveyor screws may be freely received within the space between two adjacent transverse vanes of the other of said conveyor screws during rotation of both of said conveyor screws, and the transverse vanes of each of said conveyor screws being arranged along a plurality of helical paths and each of said transverse vanes forming an angle with a radial plane passing therethrough and emanating from the axis of the respective conveyor screw.

11. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws, the axial length of the screw groove of each of said conveyor screws being substantially greater than the axial length of the screw rib thereof; and a plurality of transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws.

12. A screw conveyor comprising, in combination, a housing; a pair of similar conveyor screws having oppositely directed alternate helical screw grooves and screw ribs and being rotatably mounted in said housing adjacent each other in such a manner that said screw grooves register with each other during simultaneous rotation of said conveyor screws, the screw groove of each of said conveyor screws having a substantially rectangular cross-sectional configuration; and a plurality of transverse vanes in the screw groove of each of said conveyor screws, the transverse vanes of each one of said conveyor screws extending outwardly beyond the screw rib of said one conveyor screw and being shaped so as to project into the screw groove of the other of said conveyor screws.

References Cited in the file of this patent

UNITED STATES PATENTS

| Number | Name | Date |
|---|---|---|
| 244,961 | Wenzel | July 26, 1881 |
| 545,286 | Gutnenkunst | Aug. 27, 1895 |
| 1,468,379 | Easton | Sept. 18, 1923 |
| 1,641,682 | Kruse | Sept. 6, 1927 |
| 1,690,000 | Fahrney | Oct. 30, 1928 |
| 2,335,819 | Upton | Nov. 30, 1943 |